United States Patent [19]

Lütke

[11] Patent Number: 5,199,549
[45] Date of Patent: Apr. 6, 1993

[54] SCRAPER CONVEYOR FOR LOOSE BULK MATERIAL

[75] Inventor: Hubertus Lütke, Beckum, Fed. Rep. of Germany

[73] Assignee: Krupp Polysius AG, Fed. Rep. of Germany

[21] Appl. No.: 913,230

[22] Filed: Jul. 14, 1992

[30] Foreign Application Priority Data

Jul. 23, 1991 [DE] Fed. Rep. of Germany ....... 4124405

[51] Int. Cl.⁵ .............................................. B65G 65/06
[52] U.S. Cl. ....................... 198/520; 198/838
[58] Field of Search ............... 198/519, 520, 728, 938, 198/845; 414/133

[56] References Cited

U.S. PATENT DOCUMENTS

| | | | |
|---|---|---|---|
| 3,770,099 | 11/1973 | Bernicot | 414/133 |
| 4,231,467 | 11/1980 | Cheek | 198/519 |
| 4,248,337 | 2/1981 | Zimmer | 198/520 |
| 4,369,877 | 1/1983 | Heuer et al. | 198/520 |
| 4,440,294 | 4/1984 | Langen | 198/838 |
| 4,762,220 | 8/1989 | Lutke | 198/520 |

FOREIGN PATENT DOCUMENTS

| | | | |
|---|---|---|---|
| 222063 | 5/1987 | European Pat. Off. | 198/520 |
| 230612 | 10/1988 | European Pat. Off. | |

*Primary Examiner*—Joseph E. Valenza
*Attorney, Agent, or Firm*—Learman & McCulloch

[57] ABSTRACT

In this scraper conveyor for loose bulk material the paddle-shaped conveyor elements are supported and guided in each case by means of supporting rollers of roller guiding arrangements with upper and lower bearing surfaces in the region of at least two longitudinal central planes of reference running parallel to one another. In order to prevent supporting rollers from becoming wedged in the roller guiding arrangments, the supporting rollers are provided on both sides of the appertaining longitudinal central plane of reference and each roller guiding arrangement contains an upper guide rail on one side of the longitudinal central plane of reference and a lower guide rail on the other side for the supporting rollers.

5 Claims, 2 Drawing Sheets

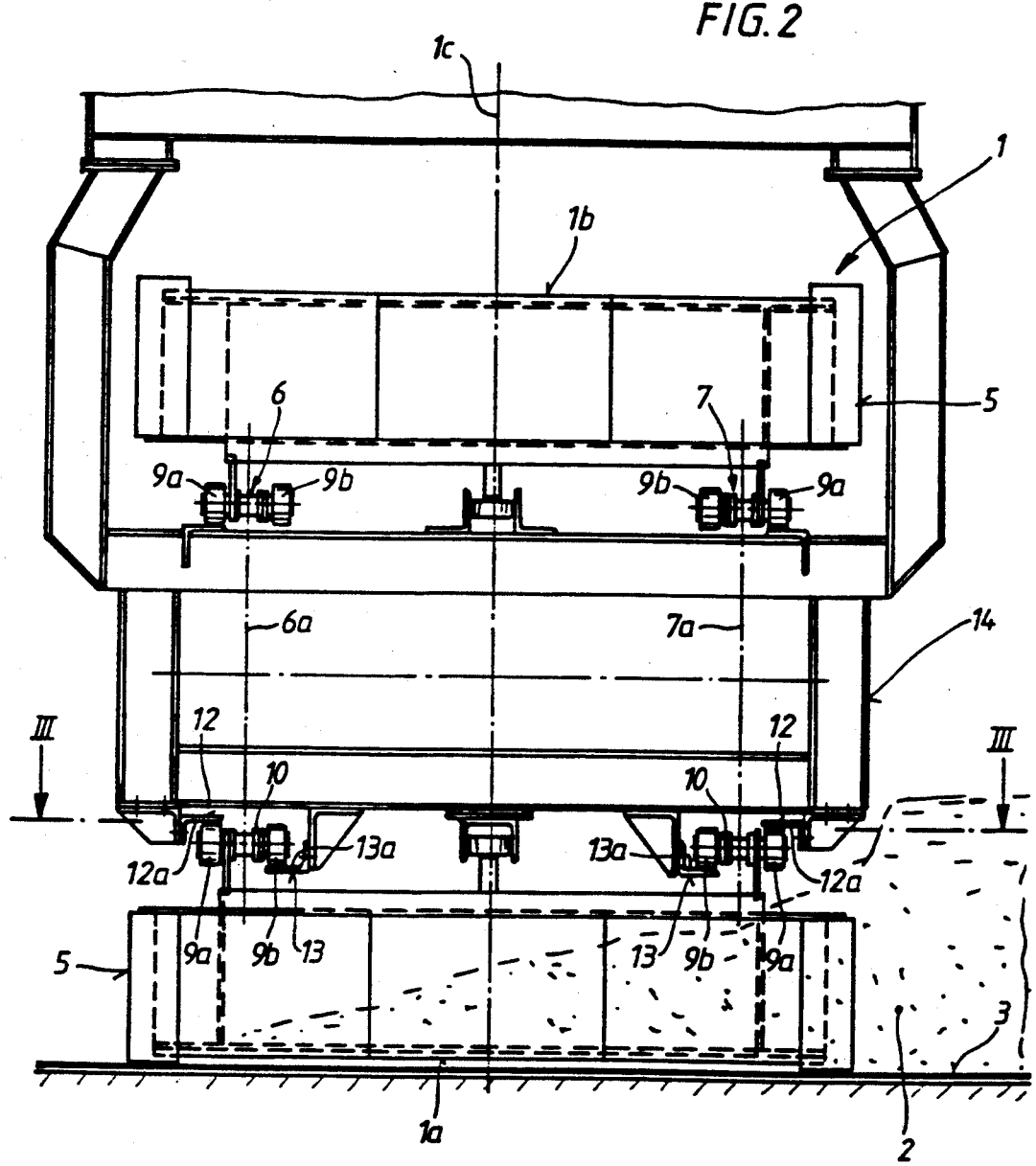
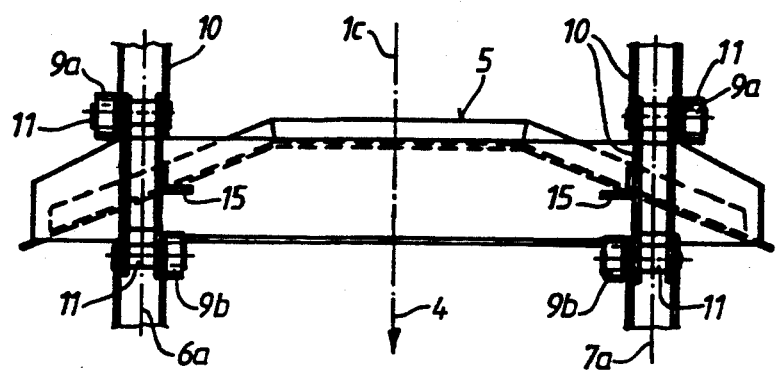

SCRAPER CONVEYOR FOR LOOSE BULK MATERIAL

The invention relates to a scraper conveyor for loose bulk material with a lower material conveying run and an upper return run, particularly in the form of a reclaiming scraper conveyor which removes bulk material from a bulk material pile, according to the preamble to claim 1.

Scraper conveyors of this type are known in the art for various applications and in differing constructions. Moreover, an example of a scraper conveyor is described and illustrated in EP-B-230 612.

In these known scraper conveyors the conveyor blades which are drawn by the continuously circulating drawing means (e.g. plate-link conveyor chains, bush chains, round steel chains, wire ropes or the like) and convey loose bulk material away are supported and guided by means of the supporting rollers of roller guiding arrangements. These roller guiding arrangements are usually guide rails which run in the longitudinal direction of the conveyor and are U-shaped in cross-section and in which the clear width between the two arms of the U is slightly greater than the diameter of the supporting rollers. In this way the inner faces which lie opposite one another of the two arms of the U form upper and lower bearing surfaces for the supporting rollers. When such a scraper conveyor is used in practice, particularly when it is used in the form of a reclaiming scraper conveyor for removal of the bulk material from a bulk material heap, it can from time to time happen, for example as a result of overloading of the conveyor from above or overfilling of individual conveyor blades, that bulk material to be conveyed passes into the guide rails. As a result the bulk material can collect above all between the supporting rollers and the bearing surfaces—and may gradually build up—so that the rollers become wedged in the guide rails and the axles or bolts bearing the supporting rollers can break due to this strain.

The object of the invention, therefore, is to improve a scraper conveyor of the type set out in the preamble to claim 1 in such a way that by relatively simple constructive means a reliable and substantially trouble-free support and guiding of the conveyor elements by the supporting rollers is ensured.

This object is achieved according to the invention by the features set out in the characterising portion of claim 1. Advantageous embodiments and further developments of the invention are set out in the subordinate claims.

Whereas in the known scraper conveyors the supporting rollers belonging to a longitudinal central plane of reference lie in one single row one behind the other, in the construction according to the invention the supporting rollers are provided on both sides of the appertaining longitudinal central plane of reference. This not only means a relatively stable construction and mode of operation but is also an advantageous prerequisite for ensuring that each roller guiding arrangement can be formed at least in the region of the lower material conveying run by an upper guide rail lying above the supporting rollers on one side of the longitudinal central plane of reference and a lower guide rail below the guide rollers on the other side of the longitudinal central plane of reference, in which case the upper guide rail then forms the upper bearing surface and the lower guide rail forms the lower bearing surface for the corresponding supporting rollers. By this separate construction and arrangement of the lower and upper bearing surfaces or the lower and upper guide rails, the upper support and guiding for the supporting rollers and thus for the paddle-shaped conveyor elements is effected only on one side of the longitudinal central plane of reference and the lower support and guiding of the supporting rollers/conveyor elements is only effected on the opposite side of the longitudinal central plane of reference. Consequently if the conveyor elements of the lower material conveying run of this scraper conveyor are overloaded or at least to some extent overfilled with material to be conveyed, then the supporting rollers can be reliably prevented from becoming wedged in the guide rails (as happens in the known constructions described). Whereas no material whatsoever can collect on the upper guide rails which form the upper bearing surfaces, any material deposited on the lower guide surfaces of the lower guide rails can be rolled over without difficulty.

As a general rule the paddle-shaped conveyor elements can be connected directly to the supporting rollers which support and guide them or to their mountings, whilst independent drawing means, e.g. bush chains, round steel chains, wire ropes or the like, which are suitably constructed and arranged ensure that the conveyor elements are connected to one another and circulate continuously. However, in a particularly preferred construction at least two plate-link conveyor chains which run with transverse spacing and parallel to one another are provided as the drawing means, their chain links being connected by joint bolts which simultaneously support the supporting rollers so that they are rotatable. In this case the longitudinal central planes of the plate-link conveyor chains form the said longitudinal central planes of reference and the supporting rollers are arranged alternating with one another on one and the other outer face of the plate-link conveyor chain on the corresponding joint bolt which in each case juts out laterally on one side.

Furthermore, in the construction just described, the features according to claim 4 are particularly advantageous because by means of the cleaning flaps which project laterally on the outer faces of some links of the plate-link conveyor chain foreign bodies (above all quantities of bulk material) which have penetrated in particular into the the lower guide rail can be taken out again and thus the corresponding bearing surface can always be kept at least to a large extent clear.

The invention will be explained in greater detail below with the aid of the drawings, in which:

FIG. 2 shows a cross-sectional view through the scraper conveyor, approximately along the line II—II in FIG. 1;

FIG. 3 shows a sectional view of a detail approximately along the line III—III in FIG. 2.

Figure 1:
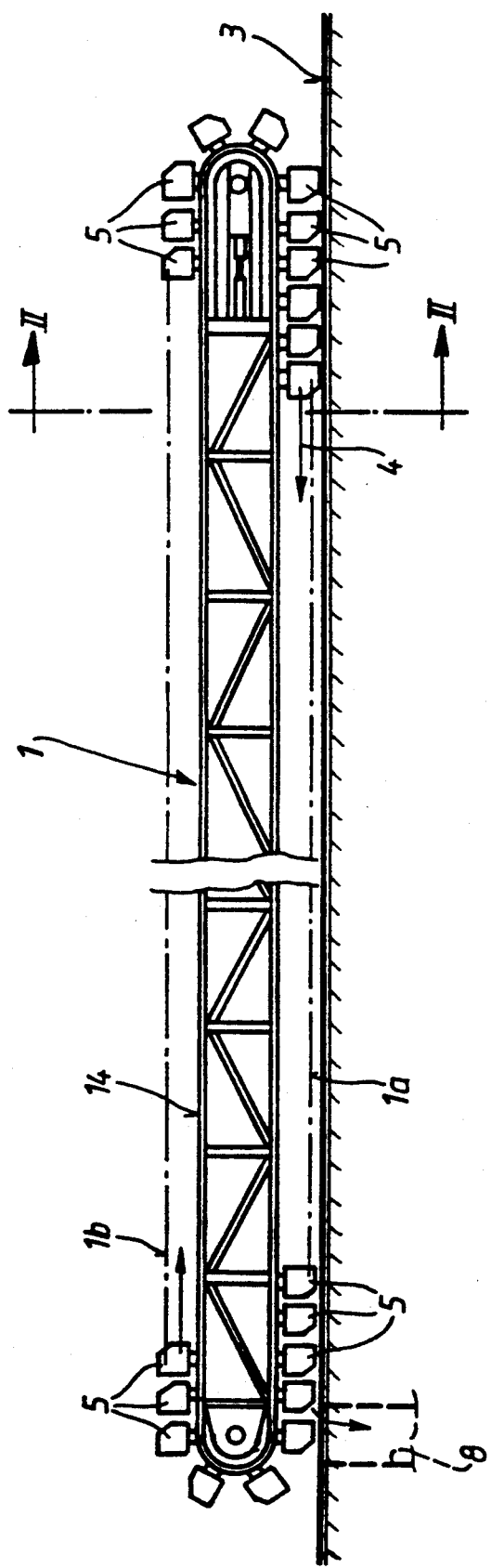
FIG. 1 shows a greatly simplified schematic side view of the scraper conveyor.

The scraper conveyor according to the invention which is illustrated in FIG. 1 is intended for conveying loose bulk material away. In the present example it may be assumed, as is also made clear in FIG. 2, that this scraper conveyor 1 is constructed above all in the form of a reclaiming scraper conveyor which removes (reclaims and conveys away) bulk material 2 from a bulk material heap 3.

In a manner which is known per se the scraper conveyor 1 contains a plurality of paddle-shaped conveyor elements, hereafter referred to as scraper blades 5, which are arranged behind one another in the direction of conveying the material (cf. arrow 4) and are connected to one another by at lest one circulating drawing means, but preferably in the present example by two plate-link conveyor chains 6, 7 which run with transverse spacing and parallel to one another, in such a way that these scraper blades are also arranged so that they circulate continuously in the scraper conveyor 1 in the direction of the arrow 4. Accordingly the scraper conveyor 1 has immediately above the base of the bulk material pile 3 a lower material conveying run 1a and an upper return run 1b, the plate-link conveyor chains 6 and 7 being deflected at the ends of the scraper conveyor 1 over drums or deflector wheels and driven in a manner which is known per se by a drive which is not shown in detail. The bulk material conveyed in the direction of the arrow 4 by the scraper blades 5 can for example be drawn off through an opening 8 at one end region of the scraper conveyor 1 or in any other suitable manner.

The two plate-link conveyor chains 6, 7 circulate in vertical longitudinal central planes 6a and 7a respectively which in the present case simultaneously form longitudinal central planes of reference for guiding arrangements for the scraper blades 5. These scraper blades 5 are supported and guided in the region of these longitudinal central planes of reference or longitudinal central planes 6a and 7a of the plate-link conveyor chains in each case by supporting rollers 9a, 9b of rail-like roller guiding arrangements, which will be explained in greater detail below.

In the illustrated embodiment the supporting rollers 9a, 9b are not held directly on the scraper blades 5 but on the plate-link conveyor chains 6 and 7. These plate-link conveyor chains 6 and 7 are generally of similar construction and each have a plurality of chain links 10 which are arranged immediately behind one another and are flexibly connected to one another by joint bolts 11 which in turn simultaneously form roller axles in order to support the supporting rollers 9a, 9b so that they are rotatable.

It is of particular importance that the supporting rollers 9a, 9b are provided on both sides of the appertaining longitudinal central plane of reference, that is to say in the present example the longitudinal central planes of reference 6a and 7a. For this purpose these supporting rollers 9a, 9b are arranged so that they are evenly distributed in the longitudinal direction of the conveyor 1 and alternate with one another on one and the other outer face of the appertaining plate-link conveyor chain 6, 7 and thus on the corresponding joint bolt 11 which juts out laterally on one side in each case, as is illustrated in FIG. 3.

Furthermore, each of the roller guiding arrangements already indicated above is correspondingly aligned with one of the said longitudinal central planes of reference 6a, 7a and contains an upper guide rail 12 lying above the supporting rollers 9a on one side of the longitudinal central plane of reference 6a, 7a in the region of the lower material conveying run 1a as well as a lower guide rail 13 lying below the other guide rollers 9b on the other side of the longitudinal central plane of reference 6a or 7a, in which case the upper guide rails 12 form upper guiding or bearing surfaces 12a on their underside and the lower guide rails 13 form lower guiding or bearing surfaces 13a on their upper side for the appertaining supporting rollers 9a or 9b respectively in order to support and to guide the latter, as can be seen in FIG. 2.

The scraper conveyor 1 can have a skeleton-like frame 14 (for example according to FIGS. 2 and 3) in the usual way and adapted to the particular use to which it is to be put. In this case the roller guiding arrangements described above are held firmly on this frame 14 and the upper and lower guide rails 12, 13 are advantageously fixed on the underside of this frame 14 in a suitable way. These upper and lower guide rails 12, 13 can be formed in a relatively simple manner by steel angle sections, preferably—as illustrated in FIG. 2—by unequal-sided angle sections in which one (longer) arm in each case forms the bearing surface 12a or 13a for the corresponding guide rollers 9a or 9b respectively. Moreover, it can be advantageous for the mountings or the guide rails 12, 13 themselves to be fixed so that they are releasable, i.e. replaceable, so that in case of need worn rails can be replaced quickly and easily.

In FIG. 2 it can be clearly seen that the construction and arrangement according to the invention of the supporting rollers 9a, 9b and the appertaining guide rails 12 and 13 respectively with the symmetrical arrangement with respect to the appertaining longitudinal central plane of reference 6a or 7a respectively as well as the symmetrical arrangement of both plate-link conveyor chains 6, 7 of the scraper blades 5 and all the appertaining guiding arrangements with respect to the principal longitudinal central plane 1c of the entire scraper conveyor 1 together permit extremely reliable and stable support, guiding and operation.

For the sake of completeness it should also be mentioned that the roller guiding arrangements in the region of the return run 1b of the conveyor 1 can be of simplified construction and can be formed for example by simple flat or angled rails in each case.

A further advantageous embodiment of the scraper conveyor 1 is illustrated in FIG. 3 in the region of its plate-link conveyor chains 6, 7. According to this some of the chain links 10 have on their outer face laterally projecting cleaning flaps 15 which can be formed in a simple manner by angle pieces which are screwed or welded on (as shown). In general it will be sufficient for these cleaning flaps to be on the one hand arranged a relatively large longitudinal distance from one another (that is to say with several chain links without cleaning flaps lying between them) and on the other hand merely attached to the outer faces of the plate-link conveyor chains 6, 7 or the chain links 10 on which lie the supporting rollers (in the present example the supporting rollers 9b) which are supported by the lower guide rails 13, on the bearing surfaces 13a of which the bulk material can first become deposited. In order that these bearing surfaces 13a can be reliably cleared (cleaned) of any deposited bulk material, the width of the cleaning flaps 15 corresponds at least to the width of the supporting rollers 9a or 9b, and they are guided along on the bearing surfaces of the appertaining guide rails, that is to say in particular on the lower bearing surfaces 13a of the lower guide rails 13.

I claim:

1. Scraper conveyor for loose bulk material with a lower material conveying run (1a) and an upper return run (1b), particularly in the form of a reclaiming scraper conveyor which removes bulk material from bulk material pile (3), containing a plurality of paddle-shaped conveyor elements (5) which are arranged behind one another in the direction of conveying the material (4), are connected by at least one continuously circulating drawing means (6, 7) and are supported and guided in the region of at least two longitudinal central planes of reference (6a, 7a) running parallel to one another, in each case by means of supporting rollers (9a, 9b) of rail-like roller guiding arrangements (12, 13) with upper and lower bearing surfaces (12a, 13), characterised in that the supporting rollers (9a, 9b) are provided on both sides of the appertaining longitudinal central plane of reference (6a, 7a) and each roller guiding arrangement contains at least in the region of the lower material conveying run (1a) an upper guide rail (12) lying above the supporting rollers (9a) on one side of the longitudinal central plane of reference and forming the upper bearing surface (12a) as well as a lower guide rail (13) lying below the supporting rollers (9b) on the other side of the longitudinal central plane of reference and forming the lower bearing surface (13a).

2. Scraper conveyor as claimed in claim 1, characterised in that the supporting rollers (9a, 9b) are arranged so that they are evenly distributed in the longitudinal direction of the conveyor (1) and alternate with one another on one and the other side of each longitudinal central plane of reference (6a, 7a).

3. Scraper conveyor as claimed in claim 2, in which at least two plate-link conveyor chains (6, 7) which run with transverse spacing and parallel to one another are provided as the drawing means, their chain links (10) being connected by joint bolts (11) which simultaneously support the supporting rollers (9a, 9b) so that they are rotatable, characterised in that the longitudinal central planes of reference (6a, 7a) of the plate-link conveyor chains (6, 7) form the longitudinal central planes of reference and the supporting rollers (9a, 9b) are arranged alternating with one another on one and the other outer face of the plate-link conveyor chains on the corresponding joint bolt (11) which in each case juts out laterally on one side.

4. Scraper conveyor as claimed in claim 3, characterised in that some links (10) of the plate-link conveyor chain have on their outer face laterally projecting cleaning flaps (15) which correspond at least to the width of the supporting rollers (9a, 9b) and can be guided along on the bearing surfaces, particularly on the lower bearing surfaces (13a) of the lower guide rails (13).

5. Scraper conveyor as claimed in claim 2, in which the roller guiding arrangements are firmly retained on a skeleton-like frame (15) of the conveyor (1), characterised in that the upper and lower guide rails (12, 13) are formed by steel angle sections which are fixed on the frame (14) and in which one arm in each case forms the bearing surface (12a, 13a) for the corresponding supporting rollers (9a, 9b).

* * * * *